United States Patent [19]
Campbell

[11] 4,013,966
[45] Mar. 22, 1977

[54] FM RF SIGNAL GENERATOR USING STEP RECOVERY DIODE

[75] Inventor: Kenneth J. Campbell, Solana Beach, Calif.

[73] Assignee: The United States of America as represented by the Secretary of the Navy, Washington, D.C.

[22] Filed: Oct. 16, 1975

[21] Appl. No.: 622,925

[52] U.S. Cl. ............................. 325/363; 325/143; 325/153

[51] Int. Cl.² ................................... H04B 1/02

[58] Field of Search .......... 325/105, 141, 143, 145, 325/146, 153, 132, 363; 331/173, 178, 19, 37, 40; 332/16 R; 328/16

[56] References Cited
UNITED STATES PATENTS

| | | | |
|---|---|---|---|
| 2,593,330 | 4/1952 | Mohr | 325/363 |
| 2,662,181 | 12/1953 | Hugenholtz | 331/19 |
| 3,155,919 | 11/1964 | Baxter et al. | 331/19 |
| 3,513,412 | 5/1970 | Breetz | 331/40 |
| 3,665,508 | 5/1972 | Gawler | 325/446 |
| 3,783,388 | 1/1974 | Disinger | 325/363 |
| 3,806,811 | 4/1974 | Thompson | 325/146 |

Primary Examiner—Robert L. Griffin
Assistant Examiner—Marc E. Bookbinder
Attorney, Agent, or Firm—R. S. Sciascia; G. J. Rubens; T. M. Phillips

[57] ABSTRACT

A step recovery diode pulse generator is driven by a fixed frequency oscillator to provide pulses which are modulated in a balanced modulator by means of a voltage controlled oscillator controlled by a variable frequency input. The output of the balanced modulator is attenuated and provides a frequency modulated RF signal output.

9 Claims, 3 Drawing Figures

FM RF SIGNAL GENERATOR USING STEP RECOVERY DIODE

BACKGROUND OF THE INVENTION

Present techniques of determining key parameters of an FM receiver under test, e.g., receiver sensitivity, bandpass characteristics, and receiving frequency, utilize a large signal generator used in conjunction with an oscilloscope and power meter. While such equipment is suitable for manual operation, it is not adaptable to automatic testing techniques. Signal generators which are adaptable to automated testing techniques, i.e., can be computer controlled, are both complex and expensive. In many cases these equipments have capabilities which are far beyond automated testing requirements, resulting consequently in the associated high cost of over design.

SUMMARY OF THE INVENTION

The present invention provides for a simple signal generator which simultaneously generates FM signals with controllable modulation characteristics on many frequencies. Very narrow pulses of known amplitude of a predetermined frequency are fed to a balanced modulator where they are frequency modulated by means of a signal fed from a voltage controlled oscillator. Attenuator means are provided at the output of the balanced modulator to allow for adjusting the radio frequency output level. A frequency modulated radio frequency signal suitable for testing key parameters of a receiver is thus provided.

Accordingly, an object of the present invention is to provide a frequency modulated RF signal generator.

Another object of the present invention is to provide a frequency modulated RF signal generator that is simple in construction.

A further object of the present invention is to provide a signal generator using step recovery diode as a simple signal generator which simultaneously generates FM signals with controllable modulation characteristics on many frequencies.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
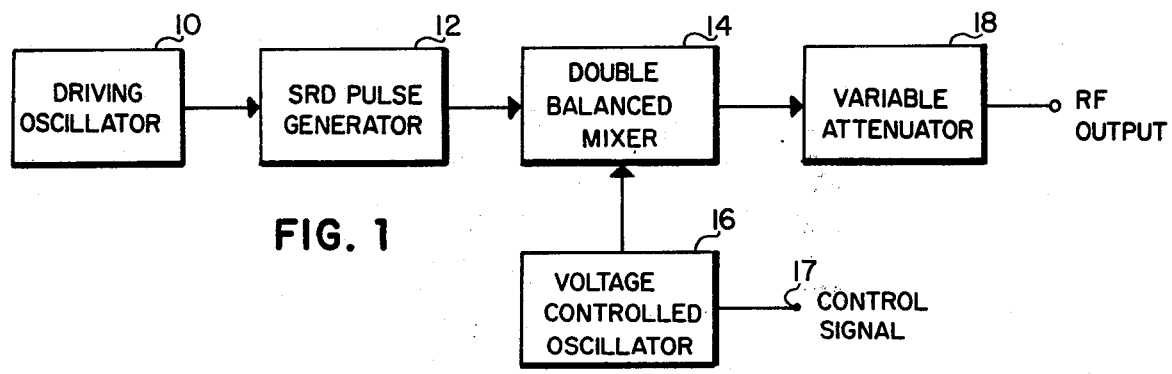
FIG. 1 is a block diagram of a preferred embodiment of the invention.
Figure 2:
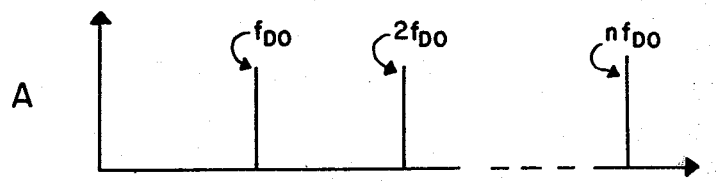
FIG. 2 is a spectrum analysis of the output signals from the step recovery diode pulse generator of FIG. 1.

Referring now to the drawing wherein there is shown in FIG. 1 a driving oscillator 10 which might, by way of example, be a CO-231 made by Vectron providing a driving signal to step recovery diode generator 12 at a predetermined frequency of, $f_{Do}$. The output signal from step recovery diode pulse generator 12 will be a very narrow pulse of known amplitude at the frequency of the output of driving oscillator 10 as shown in FIG. 2. The output pulses from generator 12 are fed to a double balanced mixer 14. A modulating signal is supplied to mixer 14, which may be, by way of example, ZLW-3, made by Mini Circuits Laboratory. A modulating signal is supplied to mixer 14 by means of a voltage controlled oscillator 16. Voltage controlled oscillator 16 may be a function generator chip, Intersil 8038 that operates at a frequency $f_{vco}$. The frequency of oscillator 16 may be varied about the frequency $f_{vco}$ by applying a control signal to its input 17.

Figure 3:
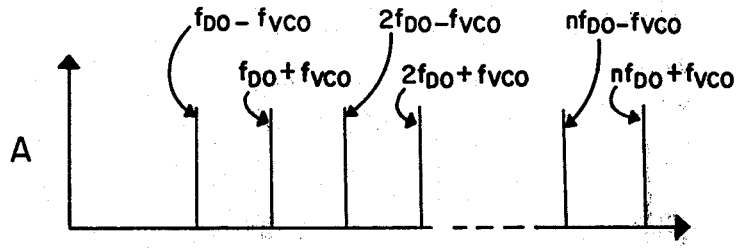
FIG. 3 is a spectrum analysis of the output signal from the balanced modulator of the system of FIG. 1.

The output of mixer 14 is a frequency modulated signal as shown in FIG. 3 and is fed to an attenuator 18 for controlling the output level of the signal generated.

In operation, driving oscillator 10 is set to run at frequency $f_{Do}$. The output of oscillator 10 is coupled to step recovery diode pulse generator 12, causing it to generate a very narrow pulse each cycle. Since a very narrow pulse exhibits nearly constant amplitude in the frequency domain, a constant amplitude comb spectrum with frequency spacing $f_{Do}$ is generated as shown in FIG. 2. The comb spectrum output of generator 12 is modulated in balanced mixer 14 by the output signal from controlled oscillator 16 operating at a frequency $f_{vco}$. As shown in FIG. 3 the first pulse is at a frequency $f_{Do} - f_{vco}$ and continuous wave RF signals are generated at the frequencies $nf_{Do} - f_{vco}$ and $nf_{Do} + f_{vco}$, where $n$ is any positive integer.

As the frequency of the output signal from variable frequency oscillator 16 is varied by applying a control voltage (not shown) at its input 17, all RF output signals from mixer 14 will vary by an amount equal to the frequency shift of the output of oscillator 16. All frequencies, i.e., $nf_{Do} \pm f_{vco}$, are frequency modulated proportional to the input signal at terminal 17 of voltage control oscillator 16. It should be further noted that all output frequencies will possess equal frequency deviations. If equal frequency spacing, $f_s$, is desired between RF signals then $f_{Do}$ should $= 2f_s$ and $f_{vco}$ should $= (f_s/2)$.

The output of balanced modulator 14 is then passed through a variable attenuator 18 in order to allow control of the amplitude of the various FM output signals.

Obviously many modifications and variations of the present invention are possible in the light of the above teachings. It is therefore to be understood that within the scope of the appended claims the invention may be practiced otherwise than as specifically described.

What is claimed is:

1. In a signal generator for generating frequency modulated RF signals available for testing key parameters of FM receivers the combination comprising:
    a. signal generating means for generating an output signal of a predetermined frequency;
    b. pulse generating means coupled to said signal generating means for generating narrow output pulses at said predetermined frequency;
    c. modulator circuit means coupled to said pulse generating means;
    d. variable frequency signal means coupled to said modulator circuit means for frequency modulating said narrow pulses to provide a plurality of frequency modulated RF signals at the output of said modulator circuit means.

2. The signal generator of claim 1 wherein said modulating circuit means in a double balanced mixer circuit.

3. The signal generator of claim 1 wherein said pulse generating means is a step recovery diode.

4. The signal generator of claim 1 wherein attenuator means are coupled to the output of said mixer means for controlling the amplitude of said RF signals.

5. The signal generator of claim 1 wherein said signal generating means is a driving oscillator.

6. The signal generator of claim 5 wherein said pulse generating means is a step recovery diode pulse generator coupled to said driving oscillator and being responsive to the output signal from said driving oscillator to generate very narrow pulses at the frequency of said driving oscillator.

7. The signal generator of claim 6 wherein said modulator circuit means is a double balanced mixer circuit having a first input coupled to the output of said step recovery diode pulse generator, a second input and an output.

8. The signal generator of claim 7 wherein said variable frequency signal means is a voltage controlled oscillator for providing a variable frequency output signal coupled to the second input of said balanced mixer for frequency modulating the narrow pulses provided by said step recovery diode generator.

9. The signal generator of claim 8 wherein attenuator means are coupled to the output of said balanced mixer for controlling the amplitude of the RF signal output.

* * * * *